No. 799,698. PATENTED SEPT. 19, 1905.
G. WESTINGHOUSE.
FRICTION DRAFT GEAR.
APPLICATION FILED JAN. 8, 1904.
5 SHEETS—SHEET 1.
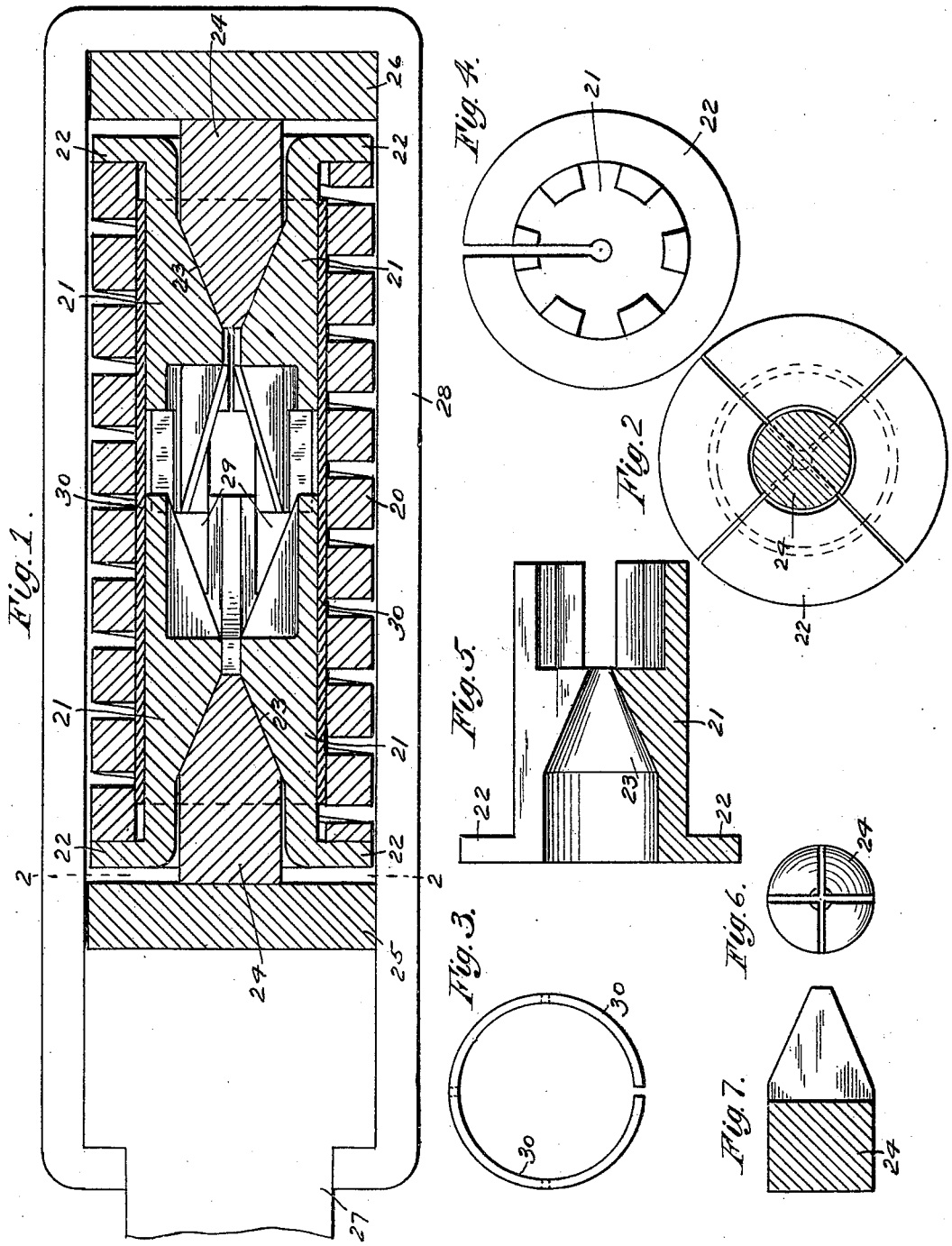
WITNESSES
INVENTOR
George Westinghouse
By E. H. Wright
Att'y.

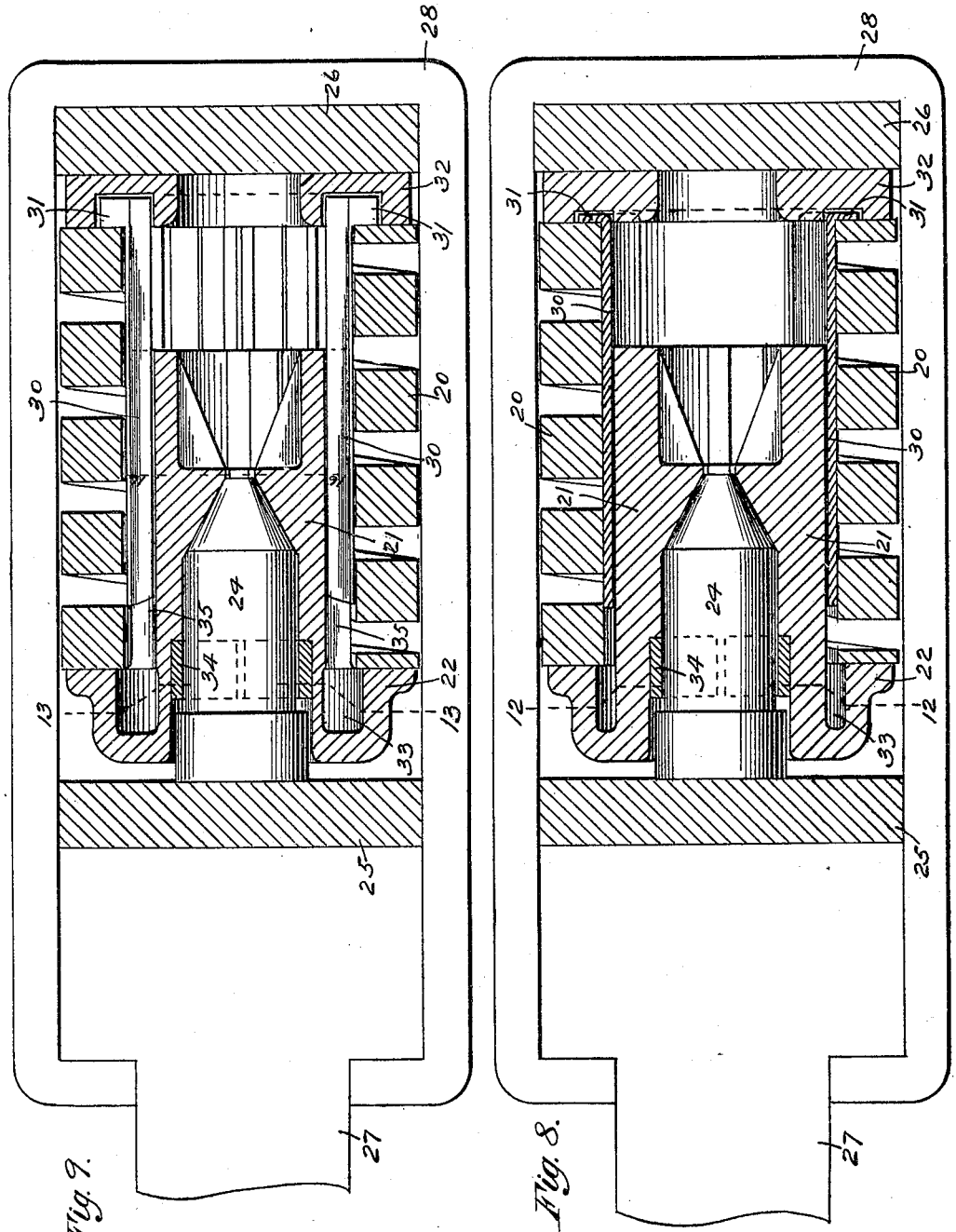

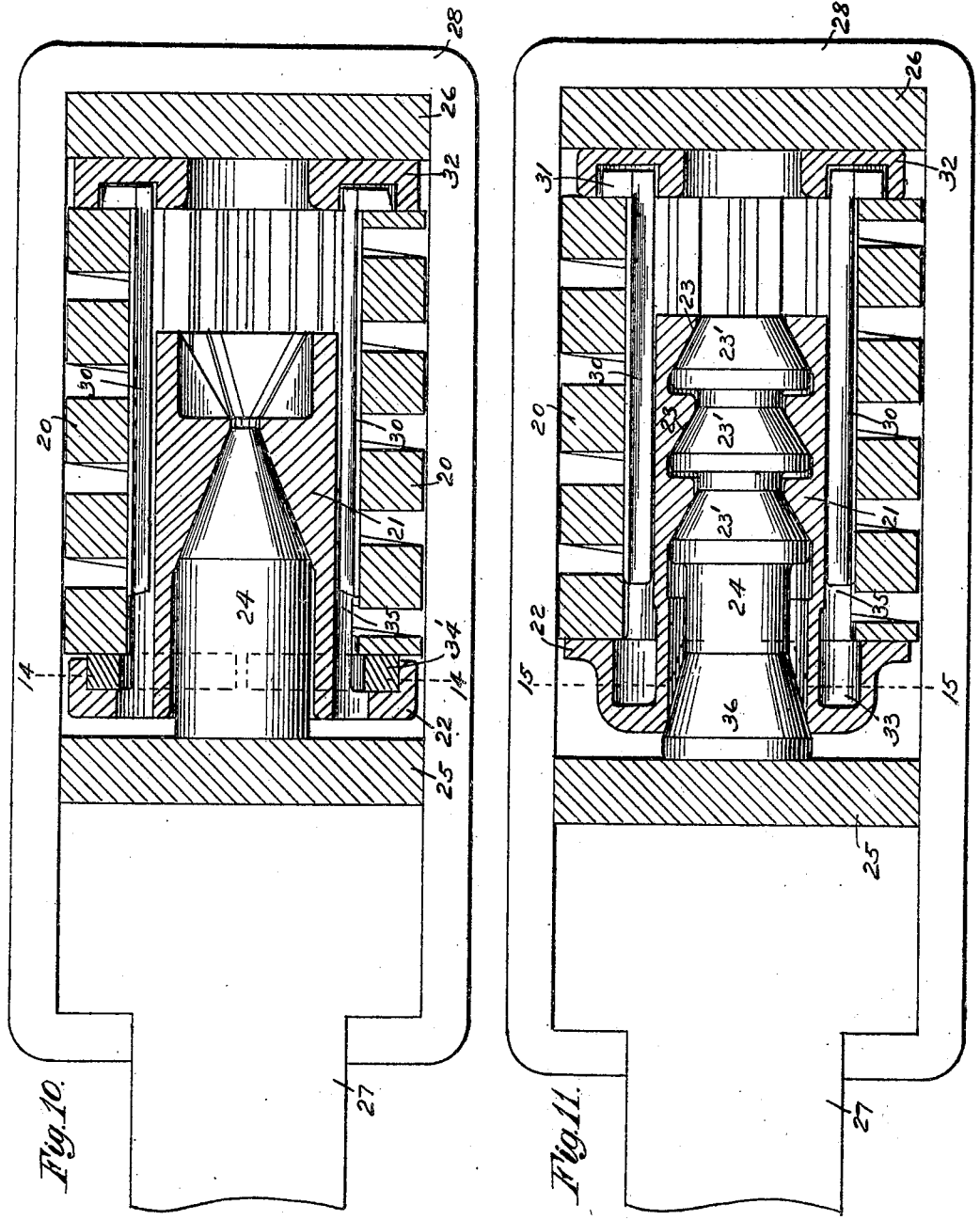

No. 799,698. PATENTED SEPT. 19, 1905.
G. WESTINGHOUSE.
FRICTION DRAFT GEAR.
APPLICATION FILED JAN. 8, 1904.

5 SHEETS—SHEET 4.

WITNESSES
J. Custer
Jas. B. MacDonald

INVENTOR
George Westinghouse
By E. Wright
Att'y.

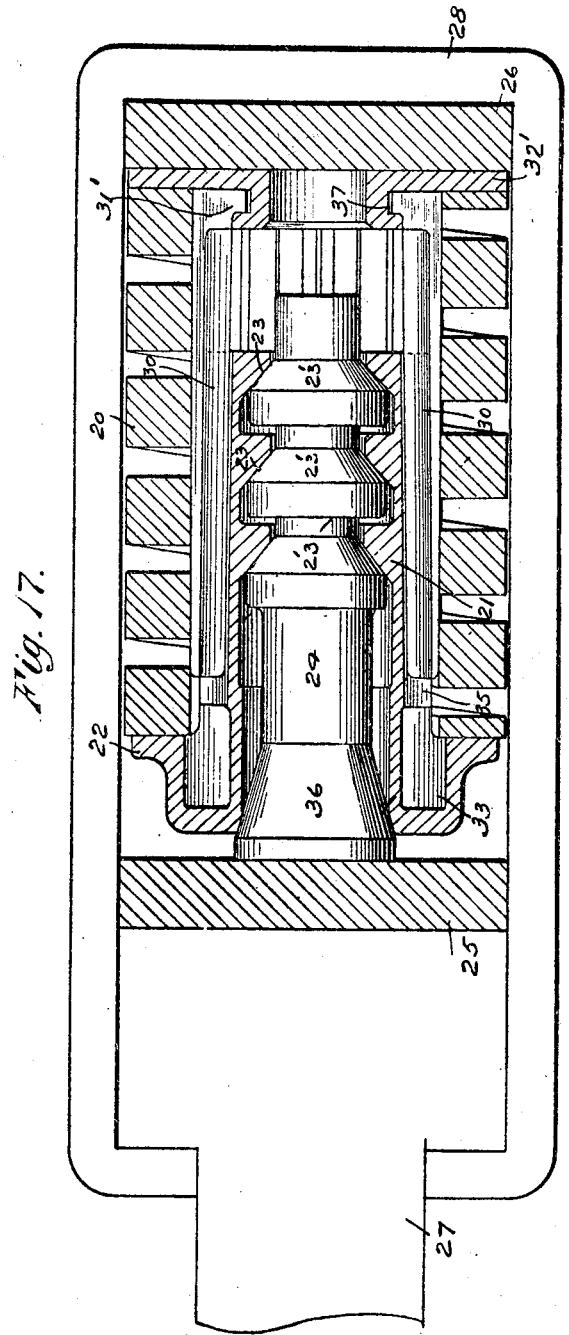

UNITED STATES PATENT OFFICE.

GEORGE WESTINGHOUSE, OF PITTSBURG, PENNSYLVANIA.

FRICTION DRAFT-GEAR.

No. 799,698.        Specification of Letters Patent.        Patented Sept. 19, 1905.

Application filed January 8, 1904. Serial No. 188,175.

*To all whom it may concern:*

Be it known that I, GEORGE WESTINGHOUSE, a citizen of the United States, residing in Pittsburg, county of Allegheny, State of Pennsylvania, have invented a certain new and useful Improvement in Friction Draft-Gear, of which improvement the following is a specification.

This invention relates in general to combined spring and friction devices for yieldingly resisting strains and gradually absorbing shocks, and more particularly to that class of these appliances used as draw-gear and buffing apparatus for railway-cars.

Heretofore in devices of this character a rigid casing having frictional surfaces has been employed to coöperate with certain relatively movable friction members and a main resistance-spring. A preliminary resistance-spring has also been proposed for the purpose of receiving the initial strains and transmitting the same to the friction members for forcing their surfaces into frictional engagement with each other.

The principal object of this invention is to simplify such apparatus by dispensing with certain parts, such as the rigid casing and the preliminary spring, and to provide a device in which the main resistance-spring itself acts as a casing for holding the inclosed friction members against transverse movement, thereby reducing the number of necessary parts and the cost of manufacture while at the same time providing a compact, durable, and efficient apparatus.

I will now describe more in detail several different forms of apparatus embodying my invention, reference being had to the accompanying drawings, in which—

Figure 13:
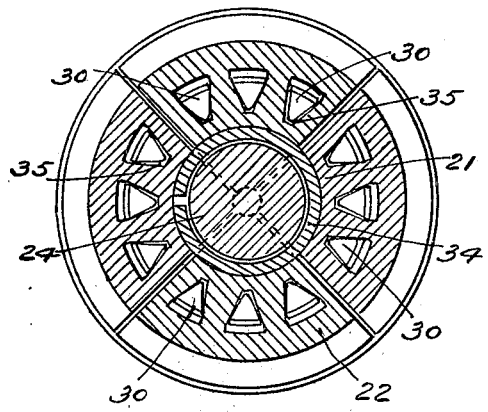
Figure 12:
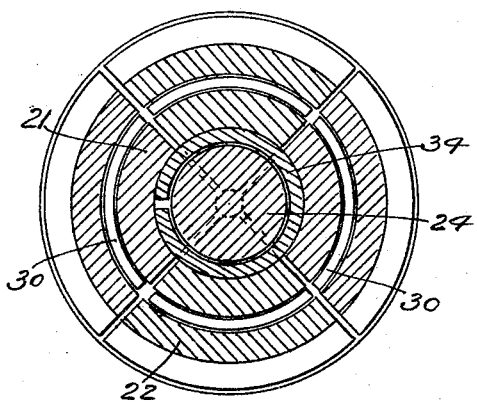
Figure 14:
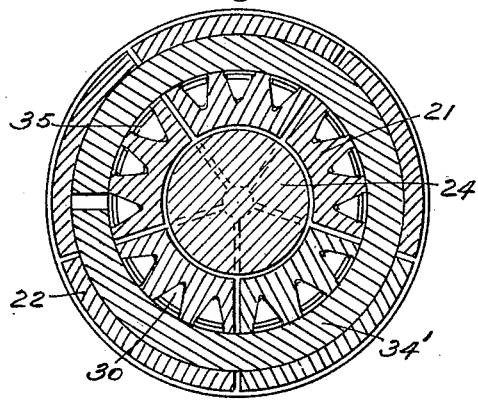
Figure 15:
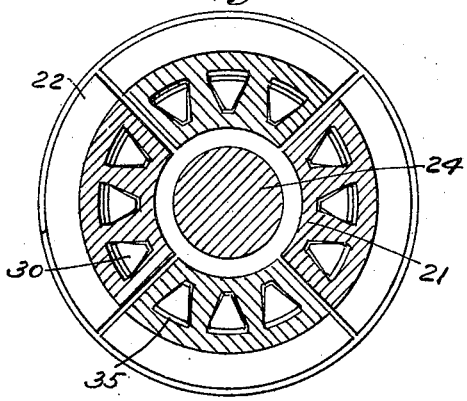
Figure 16:
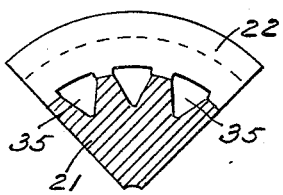

Figure 1 is a central longitudinal section of one form of my improvement, showing the same applied to the draw-bar of a railway-car; Fig. 2, a transverse section on the line 2 2 of Fig. 1; Fig. 3, an end view of the split friction sleeve or strips as shown in Fig. 1; Figs. 4 and 5, an end elevation and a longitudinal section, respectively, showing a modified form of expansible segments; Figs. 6 and 7, an end view and longitudinal section showing a modification of the central wedge-block; Fig. 8, a central longitudinal section showing a modification of my improvement; Fig. 9, a similar section of another modification; Figs. 10 and 11, similar views showing still other modifications; Fig. 12, a transverse section on the line 12 12 of Fig. 8; Fig. 13, a transverse section on the line 13 13 of Fig. 9; Fig. 14, a transverse section on the line 14 14 of Fig. 10; Fig. 15, a transverse section on the line 15 15 of Fig. 11; Fig. 16, a transverse section of one of the segments, taken on the line 16 16 of Fig. 9, and Fig. 17 a longitudinal section showing still another slight modification.

According to the construction shown in Figs. 1, 2, and 3 of the drawings a helical resistance-spring 20 of the desired length and preferably of rectangular cross-section is provided, and within the cylindrical space at each end of the coil of the spring are located a plurality of friction-segments 21, having flanges 22 extending outwardly over the ends of the coil and inclined or conical surfaces 23 engaging a corresponding inclined surface of the central wedge-blocks 24, the whole device being located between the followers 25 and 26 of the draw-bar 27 and strap 28. The inner adjacent ends of the two sets of segments are notched, as indicated at 29, and are alternately spaced, so as to overlap each other and allow for longitudinal movement of the segments as the spring is compressed when the apparatus is subjected to draft or buffing strains.

Between the outer faces of the segments and the inner cylindrical surface of the helical spring is located the split sleeve 30, which may, if desired, be divided longitudinally into several parts or strips, as indicated in Fig. 3. The length of the friction sleeves or strips is such as to leave sufficient space between the ends of said strips and the flanges of the segments to allow for the longitudinal movement of the segments as the spring is compressed.

The central wedge-blocks extend out beyond the flanges of the segments and engage the followers, so that as the apparatus shown in Fig. 1 is subjected to either a draft or buffing strain one wedge-block will be forced inward and by means of its engagement with the inclined faces of the segments will expand the same transversely into frictional engagement with the sleeve or strips 30, the latter in turn bearing against the inner cylindrical surface of the helical spring, which acts as a casing and tends to hold the friction members against further transverse movement. At the same time the longitudinal thrust is transmitted through the segments and their flanges to the resistance-spring itself, which is compressed according to the amount of strain applied. This same force is applied through the compression of the spring to the flanges of the opposite set of segments, which are thereby pressed upon the corresponding center wedge-block, which acts as an abutment against the fixed follower and serves to expand this set of segments into frictional engagement with the sleeve or strips with a pressure equal to that exerted by the opposite set of segments. Frictional resistance between the segments and the sleeve or strips and also between the strips and the inner surface of the spring is thus added to the resistance of the spring for overcoming and absorbing shocks and for transmitting the stresses as applied to the draw-bar to the car-framing. It will be noted that the entire force of the stress is transmitted through the wedge-block and inclined faces 23 of the segments to expand the same into frictional engagement with the friction sleeve or strips, so that the frictional resistance which opposes the further longitudinal movement of the segments varies according to the strain to be resisted.

When the strain upon the follower is relieved or diminished, the spring, acting by expansion upon the flanges of the opposite sets of segments, causes the same to be readily released from their frictional engagement, thus producing a very smooth and regular releasing action of the device.

The segments may be made in the form of a single integral split spring-ring, as shown in Figs. 4 and 5, and the wedge-block may likewise be provided with longitudinal saw-cuts to render the same elastic, as shown in Figs. 6 and 7.

According to the modification shown in Figs. 8 and 12 the wedge-block 24 and segments 21 are located at one end only of the spring, while the friction sleeve or strips 30 are provided with flanges 31, which extend over the opposite end of the helical spring 20 and serve to hold the strips in place.

A plate 32, having an annular recess for the flanges of the friction-strips, may be placed between the end of the spring and the follower 26.

The heads of the segments may be provided with chambers 33 for receiving the ends of the friction-strips 30 and allow for a sufficient longitudinal movement of the segments to compress the spring to its maximum, and a spring-ring 34 may be employed for normally expanding the segments with light pressure and for holding the same in alinement and preventing any transversely-inward movement of the outer ends of the segments when heavy strains are transmitted through the inclined surfaces of the wedge-block and segments.

The modification shown in Figs. 9 and 13 is similar to that just described, with the exception that a larger number of friction-strips are employed, and these are made substantially triangular in cross-section, with angular friction-faces for engaging the faces of angular grooves 35, formed longitudinally in the outer surface of the segments 21, the outer faces of the strips preferably being milled off to form a perfect bearing against the inner cylindrical surface of the helical spring. By this means the amount of frictional resistance exerted between the segments and friction-strips is greatly increased and may be raised to any desired degree by varying the angle of inclination of the friction-faces of the angular strips and the angle of the friction-faces of the angular groove in the segments.

Figs. 10 and 14 show a slight modification having five segments, in which the spring-ring 34' is located in an annular groove in the flanges of the segments and bears against the end of the helical spring.

As shown in Fig. 11, the central wedge-block 24 is provided with a plurality of inclined or conical wedging-surfaces 23' for engaging a corresponding number of inclined surfaces 23 in the segments 21, thereby distributing the transverse pressure evenly throughout the length of said segments, the angle of these wedges, together with the angle between the faces of the friction-strips and the faces of the grooves, being calculated to give the desired transverse pressure upon the friction-strips for producing the proper amount of frictional resistance. The central wedge-block may also be provided with another conical wedging-surface 36, having a much sharper angle of inclination for engaging a corresponding inclined surface at the head end of the expansible segments for the purpose of holding the segments in alinement and preventing any bending or inward transverse movement of the outer ends of the segments when the strain is applied to the other wedging-surfaces of the wedge-block.

According to the modification shown in Fig. 17 the segments 21, with their angular grooves 35, are made slightly tapering, while the friction-strips are correspondingly tapered in the reverse direction, thus securing an additional wedging action as these parts are subjected to relative longitudinal movement. By means of this construction the frictional resistance is somewhat increased for the greater strains, and the releasing action of the device is also facilitated. In this modification the ends or heads 31' of the friction-strips are turned inwardly and engage a groove 37 in the plate or ring 32', which extends over the end of the helical spring 20.

The operation is substantially the same in all of the modifications described, the entire force of the stress applied to the apparatus being transmitted through the inclined surfaces 23 to force the segments into frictional engagement with the friction-strips and to move the segments longitudinally to compress the helical spring.

When the apparatus is subjected to buffing strains, the central wedge-block is forced into the segments, causing the same to move longitudinally to compress the resistance-spring and to expand transversely to engage the friction-strips with a greater or less pressure, according to the character of the strain.

During draft strains the follower 25 and wedge-block 24 remain fixed while the follower 26 is forced forward, compressing the helical spring and moving the friction-strips longitudinally of the segments. The entire force with which the spring is compressed acts through the flanges of the segments to force the same onto the central wedge-block, so that the segments and friction-strips are pressed into frictional engagement with each other in both draft and buffing strains with equal effect. When the strain is relieved in either direction after compression, the spring in expanding to its normal position forces the segments and friction-strips longitudinally in opposite directions, the friction gradually decreasing as the spring expands, thus preventing any sticking of the parts and securing a smooth release action.

One great advantage of my improved construction resides in its simple and compact form, it being no larger than the ordinary draft and buffing spring as used on railway-cars and may be readily inserted in the space between the followers usually provided for such springs.

Having now described my invention, what I claim as new, and desire to secure by Letters Patent, is—

1. In a yielding resistance mechanism, the combination with a helical spring, of relatively movable friction members having frictional engagement with each other located within said helix and held thereby against outward transverse movement.

2. A yielding resistance mechanism comprising relatively movable friction members having longitudinal engaging surfaces and a helical resistance-spring surrounding said friction members and holding the same against outward transverse movement.

3. A yielding resistance mechanism comprising friction members having longitudinal frictional surfaces, a helical resistance-spring surrounding said friction members and forming a casing therefor, and a wedging device for forcing said members into frictional engagement.

4. A yielding resistance mechanism comprising a helical resistance-spring, friction members located within the coil of said spring, and a wedging device for forcing said members against the inner cylindrical surface of the coil.

5. A yielding resistance mechanism comprising a helical spring, friction members located within said helix, and a wedging device for expanding said friction members against the inner surface of the helix.

6. A yielding resistance mechanism comprising a plurality of segments having longitudinal friction-faces, a helical spring surrounding said segments, and a wedge-block for expanding said segments.

7. A yielding resistance mechanism comprising a helical resistance-spring, a plurality of segments and friction-strips having engaging frictional surfaces and located within said helix, and a wedge device for forcing the segments into engagement with the friction-strips and the strips against the inner surface of the coils of the spring.

8. A yielding resistance mechanism comprising a helical spring, friction members having engaging frictional surfaces, and means actuated by the strain to be resisted for forcing some of said members into frictional engagement with said spring.

9. A yielding resistance mechanism comprising a helical spring arranged in alinement with the strain to be resisted and having a friction-surface, friction members having engaging frictional surfaces, and means actuated by said strain for forcing said members into frictional engagement with each other and some of said members into frictional engagement with said spring.

10. A yielding resistance mechanism comprising a helical spring having a friction-surface, friction members movable transversely of said spring, and a wedge device actuated by the strain to be resisted for forcing the members into frictional engagement with the surface of the spring and for compressing the spring.

11. In a friction draw-gear and buffing apparatus, the combination with a helical resistance-spring, of a plurality of segments and friction-strips arranged within the coil of the spring, and means actuated by the force of the spring when compressed for expanding the segments into frictional engagement with said strips.

12. In a friction draw-gear and buffing apparatus, the combination with a helical resistance-spring, of a plurality of segments engaging one end of said spring, friction-strips engaging the opposite end of said spring, and means operated by the stress to be resisted for forcing the segments into frictional engagement with said strips and for compressing said spring.

13. In a friction draw-gear and buffing apparatus, the combination with a helical resistance-spring, of a plurality of segments and friction-strips located within the coil of said spring and engaging opposite ends thereof, and a central wedge-block actuated by the stress to be resisted for forcing the segments into frictional engagement with said strips.

14. A friction draw-gear or buffing apparatus comprising a helical resistance-spring, a plurality of segments having flanges extending over one end of said helical spring, a plurality of friction-strips having one of their ends held at the opposite end of the spring and means actuated by the stress to be resisted for forcing said segments and strips into frictional engagement with each other and for compressing said spring.

15. A friction draw-gear or buffing apparatus comprising a helical resistance-spring, two sets of friction members located within said helical spring and having coacting longitudinal friction-surfaces, opposite ends of the two sets being held at opposite ends of the spring, and means actuated by the stress to be resisted for forcing said members into frictional engagement and causing a relative longitudinal movement between the sets as the spring is compressed.

16. A friction draw-gear or buffing apparatus comprising a helical resistance-spring, a plurality of friction-strips located within said helix, a plurality of segments having frictional surfaces for engaging said strips, and inclined wedging-surfaces, and a wedge-block engaging said inclined surfaces for expanding said segments and transmitting the entire strain to which the spring is subjected.

17. A friction draw-gear or buffing apparatus comprising a helical resistance-spring, a plurality of angular friction-strips extending within said helix, a plurality of segments also extending within said helix and having angular grooves for engaging said friction-strips, and a wedge device for acting upon said segments.

18. A friction draw-gear or buffing apparatus comprising a helical spring, reversely-tapered friction members extending into said helix from opposite ends, and a wedge device for forcing said members into frictional engagement with each other.

19. A friction draw-gear or buffing apparatus comprising a helical spring, friction-strips engaging the inner surface of said helix and having one of their ends held at one end of said spring, a plurality of segments bearing at the opposite end of said spring and having frictional surfaces for engaging said friction-strips, and a wedge device for expanding said segments and friction-strips.

20. A draw-gear or buffing apparatus comprising a helical spring, friction members located within said helix, a wedge device actuated by the strain to be resisted for forcing said members into frictional engagement, and another wedge having a sharper angle of inclination for holding said members in alinement.

In testimony whereof I have hereunto set my hand.

GEO. WESTINGHOUSE.

Witnesses:
E. A. WRIGHT,
R. F. EMERY.